US012798898B2

(12) United States Patent
Silbert

(10) Patent No.: US 12,798,898 B2
(45) Date of Patent: *Nov. 17, 2026

(54) RECEPTACLE TRANSPORT CARRIER

(71) Applicant: GEN-PROBE INCORPORATED, San Diego, CA (US)

(72) Inventor: Rolf Silbert, Del Mar, CA (US)

(73) Assignee: GEN-PROBE INCORPORATED, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/793,558

(22) Filed: Aug. 2, 2024

(65) Prior Publication Data

US 2024/0391705 A1 Nov. 28, 2024

Related U.S. Application Data

(63) Continuation of application No. 17/003,754, filed on Aug. 26, 2020, now Pat. No. 12,084,294.

(Continued)

(51) Int. Cl.
*B65G 47/90* (2006.01)
*B01L 9/00* (2006.01)
(Continued)

(52) U.S. Cl.
CPC ................ *B65G 47/90* (2013.01); *B01L 9/00* (2013.01); *G01N 35/0099* (2013.01);
(Continued)

(58) Field of Classification Search
None
See application file for complete search history.

(56) References Cited

U.S. PATENT DOCUMENTS 4,133,466 A 1/1979 Rosen
5,941,366 A 8/1999 Quinlan et al.
(Continued)

FOREIGN PATENT DOCUMENTS

CN 1576197 A 2/2005
CN 106476031 A 3/2017
(Continued)

OTHER PUBLICATIONS

CNIPA First Office Action, Chinese Application No. 2020800689111, Apr. 25, 2024.

(Continued)

*Primary Examiner* — William R Harp
(74) *Attorney, Agent, or Firm* — Sterne, Kessler, Goldstein & Fox P.L.L.C.; Charles Cappellari

(57) ABSTRACT

A sample receptacle transporting carrier includes a base defining a recess for receiving a bottom end of the sample receptacle. The carrier also includes a plurality of resilient wire fingers affixed to and extending upward from the annular support. The fingers are configured to retain the bottom end of the sample receptacle within the recess of the base and to maintain the sample receptacle in an upright orientation. Each of the wire fingers includes a first segment adjacent to the base, a linear second segment joined to the first segment by a first angled portion, and a linear third segment joined to the second linear segment by a second angled portion. The third segment length is greater than the second segment length. The third segment of each finger is configured to contact the bottom end of the receptacle as the receptacle is inserted into the carrier. And the third segment and the vertical axis of the carrier form an angle between about 40° and about 50°.

30 Claims, 7 Drawing Sheets

Related U.S. Application Data

(60) Provisional application No. 62/951,019, filed on Dec. 20, 2019, provisional application No. 62/891,728, filed on Aug. 26, 2019.

(51) Int. Cl.
*G01N 35/00* (2006.01)
*G01N 35/04* (2006.01)

(52) U.S. Cl.
CPC ........ *G01N 35/04* (2013.01); *B01L 2200/025* (2013.01); *B65G 2201/0235* (2013.01); *G01N 2035/0439* (2013.01)

(56) References Cited

U.S. PATENT DOCUMENTS

| | | | |
|---|---|---|---|
| 6,068,437 A | 5/2000 | Boje et al. | |
| 7,485,264 B2 | 2/2009 | Itoh | |
| 9,505,135 B1 | 11/2016 | Malstrom et al. | |
| 9,766,258 B2 | 9/2017 | Itoh | |
| 10,359,442 B2 | 7/2019 | Kaeppeli et al. | |
| 10,919,043 B2 | 2/2021 | Johns et al. | |
| 11,047,871 B2 | 6/2021 | Arnold et al. | |
| 11,110,463 B2 | 9/2021 | Huber et al. | |
| 12,084,294 B2 * | 9/2024 | Silbert | G01N 35/04 |
| 2004/0195193 A1 | 10/2004 | Jafari et al. | |
| 2006/0222573 A1 | 10/2006 | Itoh | |
| 2011/0152822 A1 | 6/2011 | Drunk et al. | |
| 2013/0136569 A1 | 5/2013 | Rosmarin et al. | |
| 2014/0202829 A1 | 7/2014 | Eberhardt et al. | |
| 2015/0226760 A1 | 8/2015 | Itoh | |
| 2016/0054341 A1 | 2/2016 | Edelmann | |
| 2017/0131310 A1 | 5/2017 | Volz et al. | |
| 2017/0153262 A1 | 6/2017 | Lair | |
| 2017/0248624 A1 | 8/2017 | Kaeppeli et al. | |
| 2021/0061584 A1 | 3/2021 | Silbert | |

FOREIGN PATENT DOCUMENTS

| | | | |
|---|---|---|---|
| CN | 106537154 | A | 3/2017 |
| CN | 107117383 | A | 9/2017 |
| CN | 107255731 | A | 10/2017 |
| EP | 2776845 | B1 | 11/2020 |
| JP | 2006281018 | A | 10/2006 |
| JP | 2010-271204 | A | 12/2010 |
| JP | 2017-151097 | A | 8/2017 |
| JP | 6777767 | B2 | 10/2020 |
| WO | WO 2013/036941 | A2 | 3/2013 |
| WO | WO 2016/012517 | A1 | 1/2016 |
| WO | WO 2018/005239 | A1 | 1/2018 |

OTHER PUBLICATIONS

CNIPA Search Report, Chinese Application No. 2020800689111, Apr. 23, 2024.

Zhijun Han et al., "Automated Analysis of Conventional Items in Clinical Chemistry," pp. 390-391, Liaoning Science and Technology Press, 3rd edition, Aug. 2005.

EPO Communication pursuant to Article 94(3) EPC, European Application No. 20775093.6, Mar. 26, 2024.

JPO Official Action, Japanese Patent Application No. 2022-513166, Jun. 23, 2023.

CIPO Examination Report, Canadian Application No. 3,152,275, Apr. 14, 2022.

PCT International Search Report, PCT International Application No. PCT/US2020/047990, Jan. 13, 2021.

PCT Written Opinion, PCT International Application No. PCT/US2020/047990, Jan. 13, 2021.

CNIPA Second Office Action, Chinese Patent Application No. 2020800689111, Oct. 25, 2024.

CNIPA Search Report, Chinese Application No. 2020800689111, Oct. 23, 2024.

Chinese Search Report directed to Chinese Patent Application No. 2020800689111, dated Jan. 17, 2025, The State Intellectual Property Office of China, Beijing, China with English Translation, 26 pages.

* cited by examiner

RECEPTACLE TRANSPORT CARRIER

CROSS-REFERENCE TO RELATED APPLICATIONS

This application is a continuation of U.S. application Ser. No. 17/003,754, filed Aug. 26, 2020, which claims the benefit of U.S. Provisional Application Nos. 62/891,728 and 62/951,019, filed Aug. 26, 2019 and Dec. 20, 2019, respectively, each of which applications is hereby incorporated herein by reference in its entirety.

BACKGROUND

Field

Embodiments of this disclosure relate to carriers, systems, and methods for transporting a sample receptacle among various positions within an automated laboratory system.

Background

An automated laboratory system can have automated conveyor assemblies that transport samples between various locations within a laboratory. These conveyor assemblies can interface with the sample receptacle by engaging a carrier (e.g., a puck) coupled to a receptacle containing a sample to be processed. To transport the carrier and, in turn, the receptacle containing the samples, the carrier is placed on a conveyor assembly, and the conveyor assembly transports the carrier and the receptacle coupled to the carrier between various locations within the laboratory. The carrier is configured to maintain the orientation of the sample receptacle as the carrier is moved between the various locations.

To further automate this process, an automated robot (e.g., a pick-and-place robot) can be used to couple the sample containing receptacle with the carrier. For example, a pick-and-place robot can grasp a sample containing receptacle and couple the receptacle to the carrier, for example, by inserting the receptacle into a recess within the carrier. After the receptacle and the carrier are coupled, the automated conveyor assembly can move the carrier and the receptacle between various locations of the system.

SUMMARY

In some embodiments, a carrier for transporting a sample receptacle includes a base having a top end defining a recess for receiving a bottom end of the sample receptacle. The carrier also includes an annular support coupled to the top end of the base and circumscribing the recess and a plurality of resilient wire fingers affixed to and extending upward from the annular support. the plurality of resilient wire fingers are configured to retain the bottom end of the sample receptacle within the recess of the base and maintain the sample receptacle in a substantially upright orientation, each resilient wire finger comprising a first segment adjacent to the base, a linear second segment joined to the first segment, and a linear third segment joined to the second linear segment. The first and second segments of each resilient wire finger are joined by a first angled portion of the resilient wire finger. The first angled portion orienting the second segment toward a vertical axis of the carrier. The second and third segments of each resilient wire finger are joined by a second angled portion of the resilient wire finger. The second angled portion orienting the third segment away from the vertical axis of the carrier. The third segment of each resilient wire finger is configured to contact the bottom end of the receptacle as the receptacle is inserted into the carrier. The third segment and the vertical axis of the carrier form an angle between 40° and 50°.

In some embodiments, each resilient wire finger also includes a fourth segment. The third and fourth segments of each resilient wire finger are joined by a third angled portion of the resilient wire finger. The third angled portion does not orient the fourth segment toward the vertical axis of the carrier.

In some embodiments, the fourth segment is a linear segment. In some embodiments, the fourth segment extends downward from the third angled portion of the resilient wire finger. In some embodiments, the fourth segment is generally parallel to the vertical axis of the carrier. In some embodiments, the fourth segment has a fourth segment length, and the third segment has a third segment length that is greater than the fourth length. In some embodiments, the second segment has a second segment length that is greater than the fourth segment length. In some embodiments, the third segment length is greater than the second segment length. In some embodiments, the third segment length is at least 20% greater than the second segment length.

In some embodiments, the third segment length is greater than the second segment length. In some embodiments, the third segment length is at least 20% greater than the second segment length.

In some embodiments, the first segment is a linear segment.

In some embodiments, the angle formed by the third segment and the vertical axis is between 42.5° and 47.5°. In some embodiments, that angle is 45°.

In some embodiments, the plurality of resilient wire fingers comprises at least five equally spaced apart resilient wire fingers. In some embodiments, the plurality of resilient wire fingers consists of eight equally spaced apart resilient wire fingers.

In some embodiments, the resilient wire fingers are sized and arranged such that a machine-readable label affixed to the sample receptacle can be read by a label reading device.

In some embodiments, the second angled portions of the plurality of resilient wire fingers are configured to be the only points of contact between the plurality of resilient wire fingers and a cylindrical side wall of the sample receptacle when the bottom end of the sample receptacle contacts a bottom of the recess. The second angled portion of each of the plurality of resilient wire fingers is at least 30 mm from the bottom of the recess.

In some embodiments, the second angled portions of the plurality of resilient wire fingers have a common height. In some embodiments, the base comprises a plastic cylinder, and where the annular support comprises a metal. The base can contain a magnet. The base can include a plurality of spaced apart, radially extending annular flanges. The base can include three of the radially extending annular flanges, one of the radially extending flanges forming a bottom of the base.

In some embodiments, each of the plurality of resilient wire fingers is formed from stainless steel having a gauge in a range of about 0.6 mm to about 1.0 mm.

In some embodiments, a center of the bottom end of the sample receptacle may deviate from the vertical axis of the carrier by up to 6 mm without substantially affecting the force required to insert the sample receptacle into the carrier.

In some embodiments, a method of transporting a sample receptacle includes grasping the sample receptacle with a first pick-and-place robot and, with the first pick-and-place robot, inserting the sample receptacle into a carrier, for example, a carrier of any one of the above-described embodiments. The bottom end of the sample receptacle is inserted along an insertion direction into the recess of the base. The method also includes transporting the carrier with the inserted sample receptacle on a conveyor to at least one of a plurality of instruments arranged along the conveyor.

In some embodiments, the sample receptacle inserted into the carrier is a self-standing sample receptacle.

In some embodiments, the method also includes removing the sample receptacle from the carrier at a first location on the conveyor and transporting the removed sample receptacle into one of the plurality of instruments with a second pick-and-place robot.

In some embodiments, inserting the sample receptacle into the carrier requires an insertion force of no more than a predetermined maximum amount of force.

DESCRIPTION OF THE DRAWINGS

The accompanying drawings, which are incorporated herein and form a part of the specification, illustrate the embodiments and, together with the description, further serve to explain the principles of the embodiments and to enable a person skilled in the relevant art(s) to make and use the embodiments.

The features and advantages of the embodiments will become more apparent from the detailed description set forth below when taken in conjunction with the drawings, in which like reference characters identify corresponding elements throughout.

DETAILED DESCRIPTION

Figure 1:
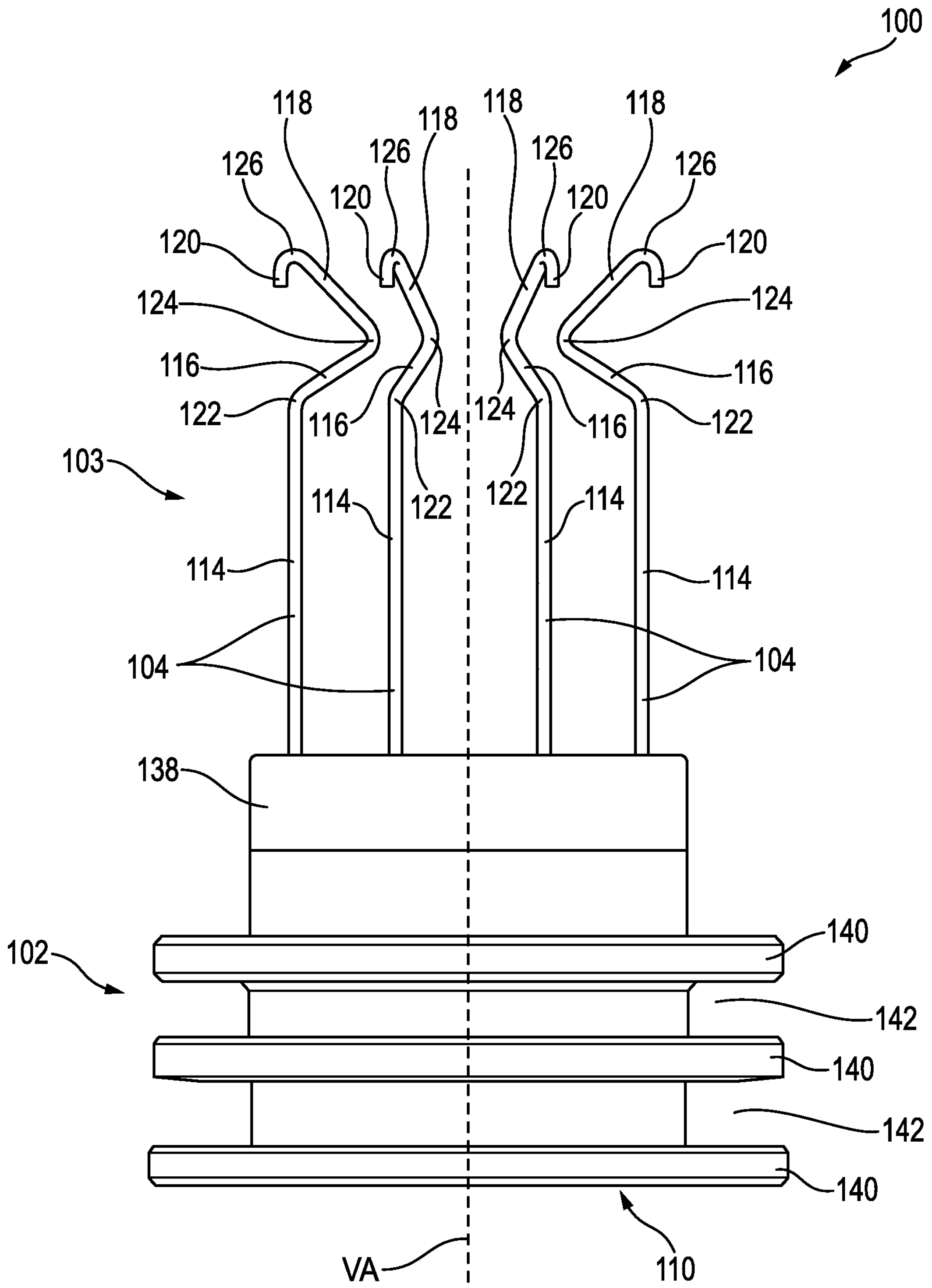
FIG. 1 is a side view of a carrier according to an embodiment.

The present disclosure will now be described in detail with reference to embodiments thereof as illustrated in the accompanying drawings. References to "one embodiment," "an embodiment," "some embodiments," "an exemplary embodiment," "for example," "an example," "exemplary," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

As used herein, "a" or "an" means "at least one" or "one or more."

As used herein, the term "about," or a similar term, applies to all numeric values specified herein, whether or not explicitly indicated. This term generally refers to a range of numbers that one of ordinary skill in the art would consider as a reasonable amount of deviation to the recited numeric values (i.e., having the equivalent function or result) in the context of the present disclosure. For example, and not intended to be limiting, this term can be construed as including a deviation of ±10 percent of the given numeric value provided such a deviation does not alter the end function or result of the value. Therefore, under some circumstances as would be appreciated by one of ordinary skill in the art a value of about 1% can be construed to be a range from 0.9% to 1.1%.

As used herein, the term "adjacent," or a similar term, refers to being near or adjoining. Adjacent objects can be spaced apart from one another or can be in actual or direct contact with one another. In some instances, adjacent objects can be coupled to one another or can be formed integrally with one another.

As used herein, the terms "substantially" and "substantial," or similar terms, refer to a considerable degree or extent. When used in conjunction with, for example, an event, circumstance, characteristic, or property, the terms can refer to instances in which the event, circumstance, characteristic, or property occurs precisely as well as instances in which the event, circumstance, characteristic, or property occurs to a close approximation, such as accounting for typical tolerance levels or variability of the embodiments described herein.

As used herein, a "sample" refers to any material to be analyzed, regardless of the source. The material may be in its native form or any stage of processing (e.g., the material may be chemically altered or it may be one or more components of a sample that have been separated and/or purified from one or more other components of the sample). A sample may be obtained from any source, including, but not limited to, an animal, environmental, food, industrial or water source. Animal samples include, but are not limited to, peripheral blood, plasma, serum, bone marrow, urine, bile, mucus, phlegm, saliva, cerebrospinal fluid, stool, biopsy tissue including lymph nodes, respiratory tissue or exudates, gastrointestinal tissue, cervical swab samples, semen or other body or cellular fluids, tissues, or secretions. Samples can be diluted or contained within a receptacle containing diluents, transport media, preservative solution, or other fluids. As such, the term "sample" is intended to encompass samples contained within a diluent, transport media, and/or preservative or other fluid intended to hold a sample.

As used herein, a "sample receptacle" refers to any type of fluid container, including, for example, a tube, vial, cuvette, cartridge, microtiter plate, etc., that is configured to contain a sample in its native form or at any stage of processing.

Exemplary Sample Receptacle Transport Carriers

In some embodiments, a carrier is configured to couple with a sample receptacle and to operatively interface with instruments of an automated laboratory system, including for example conveyor assembly, sample processing instruments, and assay instruments. The carrier is used to move a sample receptacle between various locations, devices or instruments along the conveyor assembly, such as sample receptacle loading stations, cappers/decappers, sample processing instruments assay instruments and/or storage units associated with an automated laboratory system. An example of such an automated laboratory system is described in U.S. Provisional Application No. 63/014,624, filed Apr. 23, 2020. When the carrier and the receptacle are coupled, the carrier retains the receptacle relative to the carrier at a known orientation. In some embodiments, this known orientation is vertical, while in other embodiments the known orientation is non-vertical.

By maintaining the orientation of the sample receptacle relative to the carrier at a known orientation, the position of the receptacle may be determined by determining the position of the carrier. This known relationship allows automated instruments within the automated laboratory system to interface with the receptacle. Exemplary automated instruments may include assay instruments capable of analyzing a sample and rendering a result, for example, any instrument capable of performing a molecular assay (e.g., a nucleic acid based amplification reaction), a sequencing reaction, an immunoassay, or chemical analysis on a sample. In some embodiments, an assay may be carried out directly on a sample without any sample processing, while other samples require processing before an assay may be carried out. Samples requiring some form of sample processing before being subjected to the steps of an assay may include, in some embodiments, samples containing cellular material, tissue, stool, mucus, semen, cerebrospinal fluid, blood, bone marrow, serum, urine, bile, phlegm, sputum, and exosomes, among others. Exemplary assay instruments include the Tigris®, Panther®, and Panther Fusion® systems sold by Hologic, Inc., Marlborough, MA. Other exemplary automated instruments may include, for example, a sample processing instrument that is capable of performing a processing step on a sample contained within a receptacle before performing an assay on the sample, and is not capable of analyzing a sample and/or rendering a result. Such sample processing instruments may include, for example, an instrument that transfers a sample from one receptacle to another receptacle (e.g., between different receptacle types, such as differently dimensioned receptacles), but does not perform an assay on the sample. An exemplary sample processing instrument is the Tomcat® instrument sold by Hologic, Inc., Marlborough, MA. Automated instruments or devices other than assay instruments and sample processing instruments, such as devices dedicated to performing nucleic acid purification, cappers/decappers, input/output queues, and storage instruments, may interface with the carrier and the receptacle coupled thereto.

FIGS. 1-7 illustrate a carrier 100 according to an embodiment. Carrier 100 comprises a base 102 configured to interface with, for example, a suitable automated conveyor assembly, assay instruments, and processing instruments. Carrier 100 also includes a retention device 103 that is configured to secure a sample receptacle 200 to base 102.

Carrier 100 may be configured for use with various types of conveyor assemblies and automated instruments. For example, carrier 100 may be used with conveyor assemblies that include one or more movable tracks that define the path along which carrier 100 moves. In some track embodiments, the track may be unitary belt or a plurality of links coupled to form one or more belts. In such track embodiments, carrier 100 sits on the track(s) and moves as the track(s) move. In other track embodiments, a magnetic motion system may be situated beneath a track and provide motive forces to carrier 100, for example, by using ferrous coils situated beneath the track and one or more magnets 150 in carrier 100 to propel carrier 100 along the track. Details of non-limiting exemplary embodiments of magnetic motion systems are illustrated and described in U.S. Pat. Nos. 9,766,258 and 9,776,811.

In some embodiments, base 102 has a top end 108 and a bottom end 110. As shown in FIGS. 1-7, base 102 is generally cylindrical and puck-like in appearance. In other embodiments, base 102 may have a non-cylindrical shape. Base 102 may define a recess 112 configured to receive at least portion of sample receptacle 200. For example, top end 108 may define recess 112. Recess 112 is configured to receive a bottom end 204 of sample receptacle 200.

In some embodiments, the shape of recess 112 substantially corresponds to the shape of the sample receptacle 200. For example, if sample receptacle 200 is cylindrical, recess 112 may also be cylindrical. In some embodiments, recess 112 includes a depth 132 that is configured to receive bottom end 204 of sample receptacle 200. In some embodiments, the horizontal dimensions (for example, diameter if circular or width and length if rectangular) of recess 112 are equal to or greater than the horizontal dimensions of sample receptacle 200. In some embodiments, recess 112 is configured to receive a cylindrical sample receptacle 200 having a diameter in the range of about 12 mm to about 16 mm. Accordingly, the diameter of recess 112 in such embodiments is greater than about 12 mm and less than about 16 mm.

Referring to FIGS. 2-5 and 7, in some embodiments base 102 includes a ring-shaped stopper 136 that defines a lower portion of recess 112 and abuts an interior surface 113 of base 102. In some embodiments, stopper 136 includes a base 128 that defines a lower end of recess 112, such that bottom end 204 of sample receptacle 200 contacts base 128 when sample receptacle 200 is fully inserted into recess 112. In some embodiments, stopper 136 includes an upper tapered surface 137 that can direct bottom end 204 of a misaligned sample receptacle 200 toward the center of recess 112 when sample receptacle 200 is inserted into carrier 100.

As best seen in FIG. 1, base 102 includes a plurality of spaced apart, radially extending annular flanges 140. Each pair of adjacent flanges 140 defines an annular groove 142, and grooves 142 and flanges 140 may be used by the conveyor assembly and/or an automated instrument to transport or handle carrier 100. For example, opposed protrusions of the conveyor assembly may extend into an upper groove 142, thereby holding base 102 of carrier 100 down on the conveyor (see, e.g., U.S. Pat. Nos. 9,766,258 and 9,776,811). In some embodiments, grooves 142 may also be used by the conveyor assembly to maintain the orientation of carrier 100 on the conveyor assembly or to hold or divert carrier 100 in different directions.

As shown in FIGS. 1-5 and 7, base 102 includes three flanges 140 and two grooves 142 in some embodiments. In other embodiments (not shown), base 102 may include less than three flanges 140 and/or less than two grooves 142. In still other embodiments, base 102 may include more than three flanges 140 and/or more than two grooves 142. Grooves 142 may have various shapes, sizes, and orientations. In some embodiments, the bottommost flange 140 forms part of a bottom end 110 of base 102.

Base 102 may be formed from a plastic. For example, in some embodiments, base 102 may be made of ultra-high molecular weight polyethylene (UHMWPE). In other embodiments, base 102 may be formed from a metal, such as stainless steel.

In some embodiments, base 102 may include a magnet 150 adjacent to or forming part of a bottom surface of carrier 100. Magnet 150 may be configured to operatively couple with a magnet or ferrous material associated with the conveyor assembly or in an automated instrument (see, e.g., U.S. Pat. Nos. 9,766,258 and 9,776,811).

In some embodiments, retention device 103 may include an annular support 138 and a plurality of upwardly extending wire fingers 104. Wire fingers 104 may be resilient, such that fingers 104 deflect during normal operation, and then return to their respective original positions after removal of sample receptacle 200. Each wire finger 104 is configured to apply a radially inward force to sample receptacle 200 when received by base 102. As such, wire fingers 104 collectively clamp a portion of sample receptacle 200, thereby securing sample receptacle 200 to base 102.

Wire fingers 104 are configured to provide a sufficient clamping force to maintain the orientation and position of sample receptacle 200 as the conveyor assembly moves carrier 100 or as an automated instrument interfaces with sample receptacle 200. Wire fingers 104 are also configured to flex, thereby allowing sample receptacle 200 to be inserted within recess 112 of base 102. For example, wire fingers 104 may be made of stainless steel and have a gauge in the range of about 0.6 mm to about 1.0 mm. In some embodiments, wire fingers 104 are constructed from stainless steel having gauge of about 0.8 mm. In some embodiments, the sum of the clamping forces applied to receptacle 200 is equal to or greater than about four pounds. In other embodiments, the sum of the clamping forces applied to receptacle 200 is equal to or greater than about 6 pounds.

Figure 5:
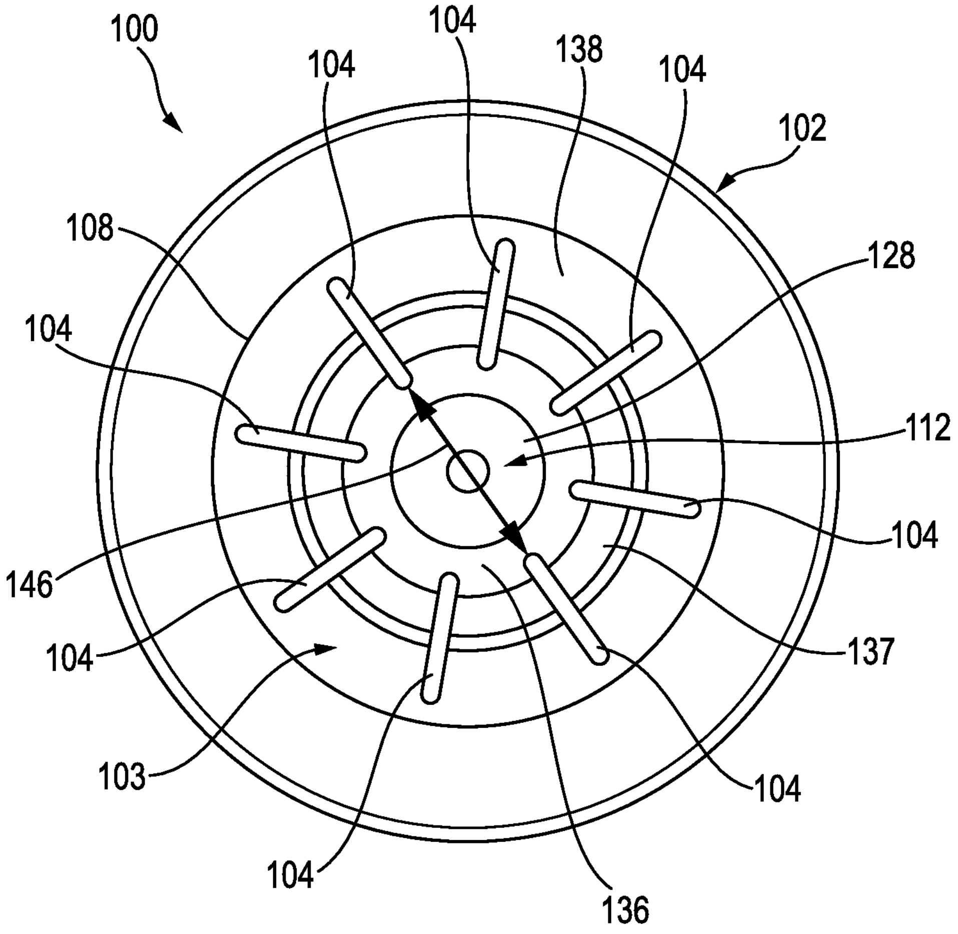
FIG. 5 is a top view of the carrier shown in FIG. 1, according to an embodiment.
Figure 6:
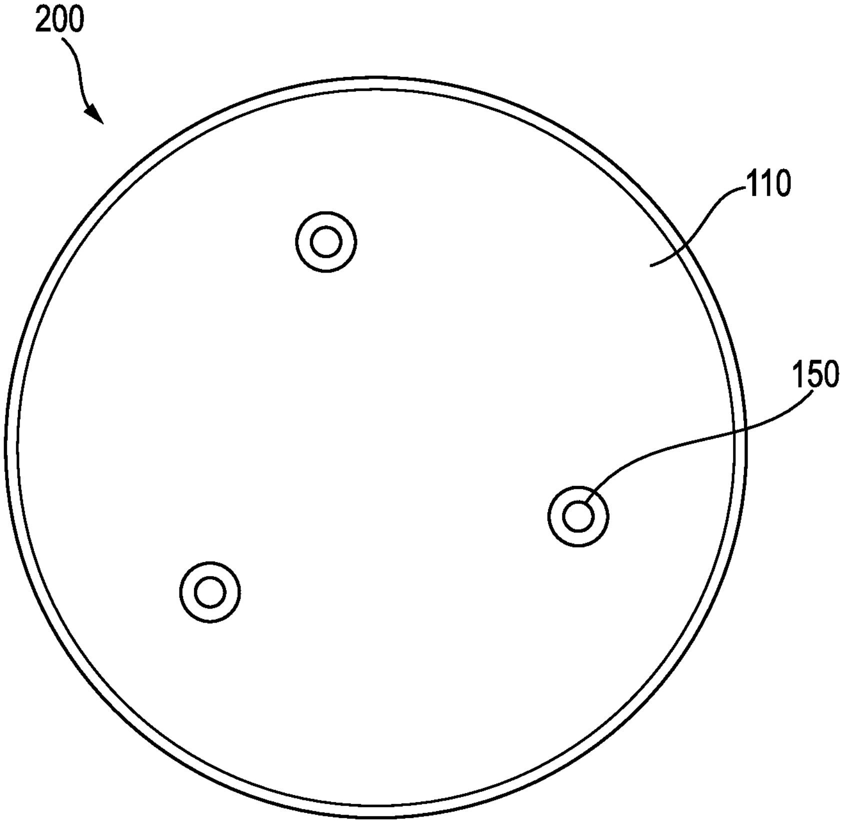
FIG. 6 is a bottom view of the carrier shown in FIG. 1, according to an embodiment

The number of fingers 104 associated with a carrier 100 should be sufficient to prevent sample receptacle 200 from slipping between adjacent fingers 104, but the number of fingers 104 should not prevent or interfere with insertion of sample receptacle 200 by a robot or obscure a machine-readable label 208 (e.g., barcode) on sample receptacle 200. In the embodiment shown in FIGS. 1 and 5, carrier 100 has eight fingers 104. In other embodiments, carrier 100 has more or less than eight fingers 104. In some embodiments, carrier 100 has at least five fingers 104. For example, carrier 100 may have six to ten fingers 104. As best seen in FIG. 5, fingers 104 may be circumferentially and equally spaced around a vertical axis VA of carrier 100. In other embodiments, the circumferential spacing between adjacent fingers 104 may not be equal.

Figure 2:
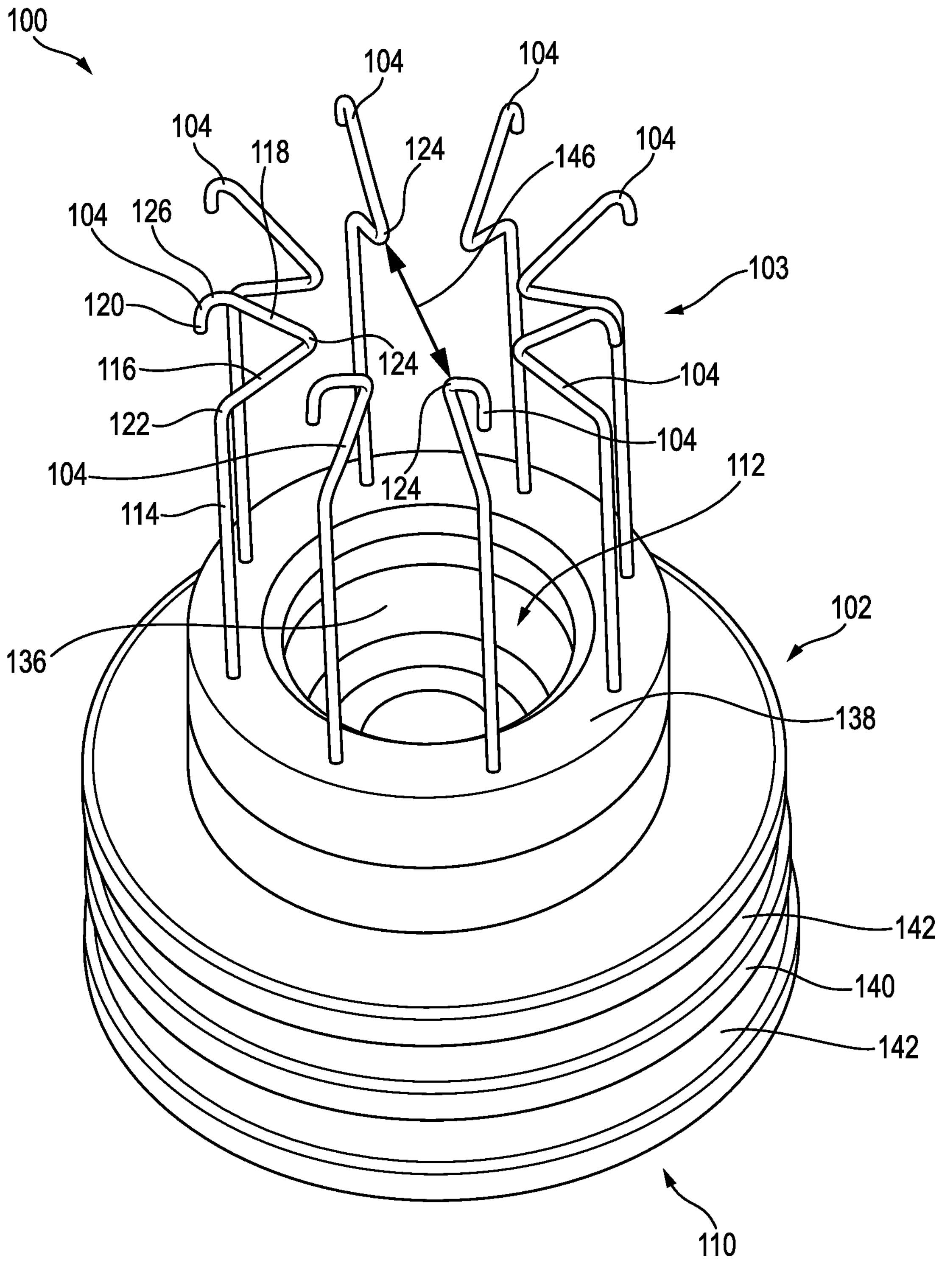
FIG. 2 is a top perspective view of the carrier shown in FIG. 1, according to an embodiment.
Figure 3:
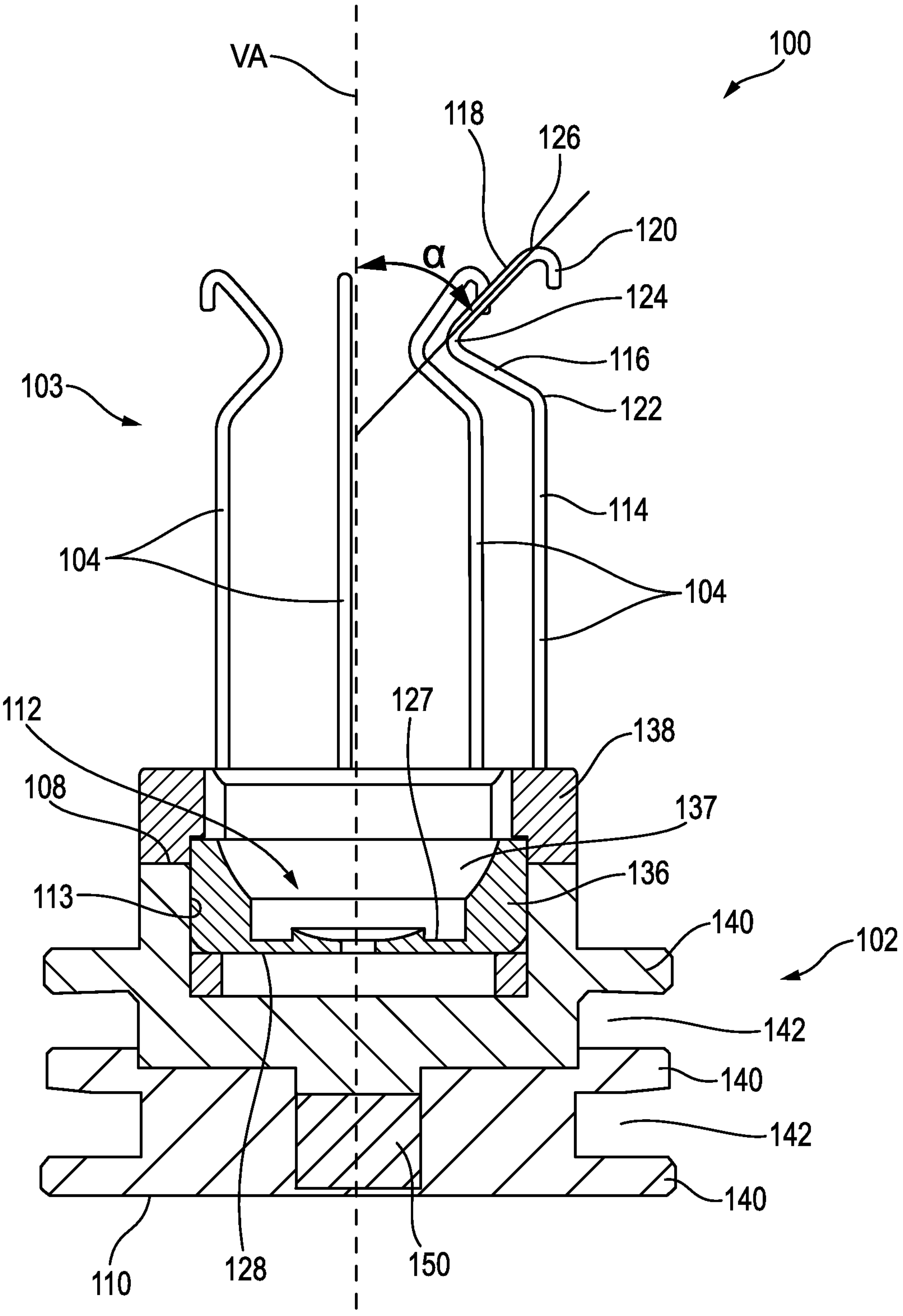
FIG. 3 is a side cross-sectional view of the carrier shown in FIG. 1 along a plane intersecting the center of the carrier, according to an embodiment.

Support 138 couples fingers 104 to base 102. Fingers 104 may be affixed, such as by welding or soldering, to support 138. In some embodiments, support 138 has an annular shape that circumscribes recess 112, which is best seen in FIG. 5. As best seen in FIGS. 1 and 2, support 138 is coupled to top end 108 of base 102. In some embodiments, support 138 may be coupled to base 102 using fasteners (e.g., screws or bolts). In other embodiments, support 138 may be coupled to base 102 using a snap-fit or friction fit. As best seen in FIGS. 2 and 5, fingers 104 are affixed at locations inwardly spaced in the radial direction from the outer periphery of the support 138.

Support 138 may be made of a metal. For example, support 138 may be made from stainless steel.

As best seen in FIGS. 1-4 and 7, fingers 104 extend upward from support 138 and away from base 102. In some embodiments, each finger 104 includes at least a first segment 114 a second segment 116 joined to the first segment 114, and a third segment 118 joined to the second segment 116. First segment 114 is adjacent to base 102 and extends from support 138. In some embodiments, such as those shown in FIGS. 1-4 and 7, each of the first segments 114 is linear (i.e., extends along a straight or nearly straight line). In some embodiments, such as those shown in FIGS. 1-4 and 7, each of the first segments 114 is vertically oriented. In other embodiments (not shown), some or all of the first segments 114 are non-linear (e.g., convex configuration relative to the vertical axis VA of carrier 100) and/or have a non-vertical orientation.

First and second segments 114, 116 of each finger 104 may be joined by a first angled portion 122 orienting second segment 116 toward the vertical axis VA of carrier 100. As shown in FIG. 1, second segment 116 extends inward and upward from first segment 114. In some embodiments, second segment 116 is linear, as shown in FIGS. 1-4. In other embodiments (not shown), second segment 116 may be non-linear.

Second and third segments 116, 118 of each finger 104 may be joined by a second angled portion 124 orienting third segment 118 away from vertical axis VA of carrier 100. As shown in FIG. 1, third segment 118 extends outward and upward from second segment 116. Thus, when a bottom surface 212 of bottom end 204 of sample receptacle 200 contacts third segments 118 of fingers 104 as sample receptacle 200 is being inserted along a direction parallel to vertical axis VA, fingers 104 (including angled portions 124) deflect radially outward, thereby permitting sample receptacle 200 to be fully inserted into recess 112 of base 102. Due to the resilient nature of fingers 104, fingers 104 are inwardly biased when sample receptacle 200 is supported by carrier 100, such that angled portion 124 of each finger 104 to clamp against the outer surface of sample receptacle 200. In some embodiments, second angled portions 124 of fingers 104 are the only points of contact between fingers 104 and an upper portion of a cylindrical side wall 202 of sample receptacle 200 when bottom end 204 of sample receptacle 200 contacts base 128 of stopper 136.

As best seen in FIGS. 1-4, third segment 118 is linear and forms an angle α with vertical axis VA of carrier 100 that is between 40° and 50°, between 42.5° and 47.5°, or 45°. Based on the angle and linear construction of the third segment 118, it was determined that the magnitude of the insertion force needed to outwardly deflect a respective finger 104 when bottom surface 212 of bottom end 204 of sample receptacle 200 remains substantially constant regardless of the exact point along third segment 118 contacted by bottom surface 212. As such, the vertical axis of sample receptacle 200 may deviate from vertical axis VA of carrier 100 nearly by the length of the horizontal projection of third segment 118 without substantially affecting the force required to insert the sample receptacle 200 into the carrier 100. For example, if the horizontal projection of third segment 118 is 6 mm, the position of sample receptacle 200 may deviate from vertical axis VA of carrier 100 up to about 6 mm without substantially affecting the force required to insert the sample receptacle 200 into the carrier 100. In some embodiments, third segment 118 is configured such that the length of the horizontal projection is greater than or equal to the sum of the maximum horizontal position error of the pick-and-place robot and the manufacturing tolerance of the sample receptacle 200.

Figure 4:
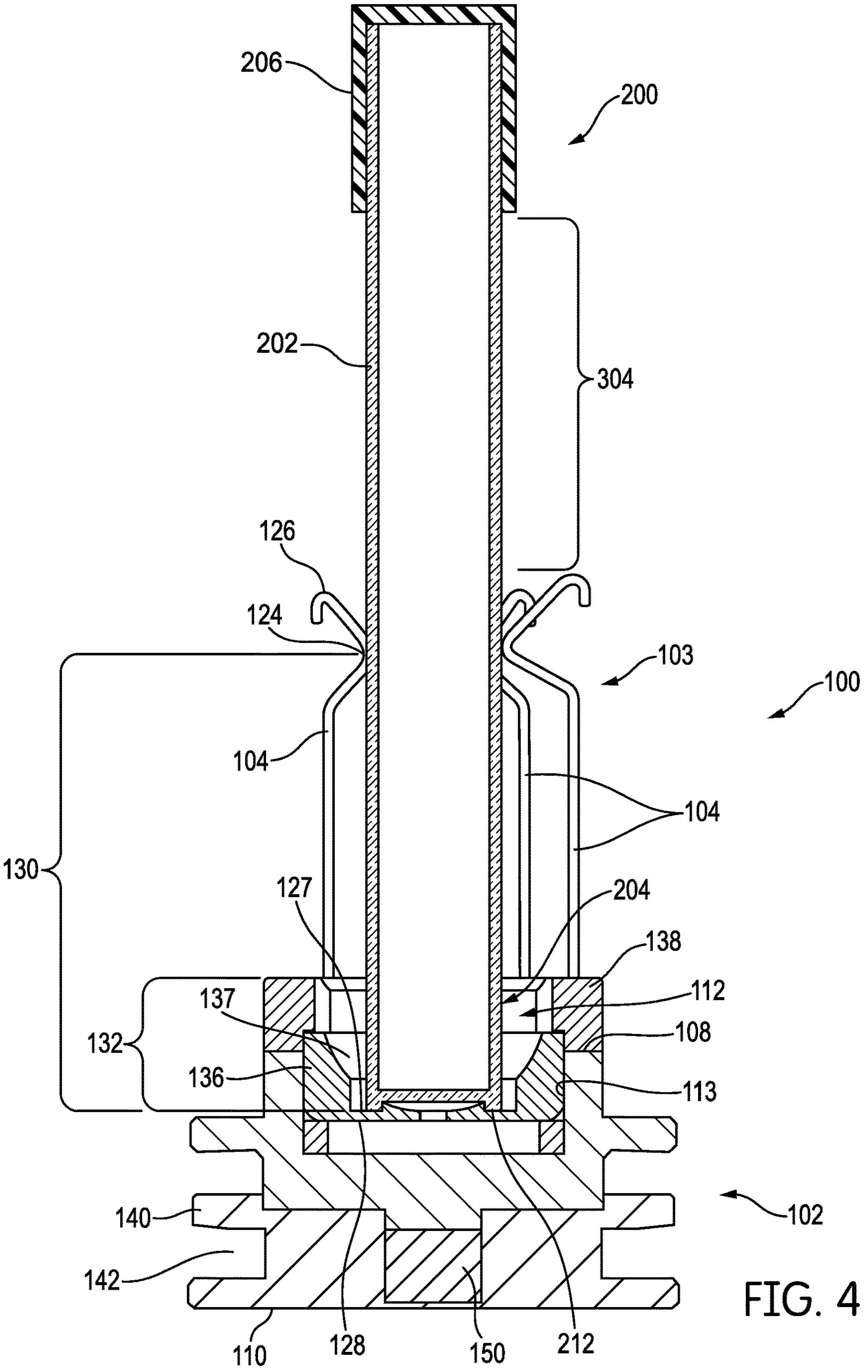
FIG. 4 is a side cross-sectional view of the carrier shown in FIG. 1 along a plane intersecting the center of the carrier while a sample receptacle is coupled to the carrier, according to an embodiment.
Figure 7:
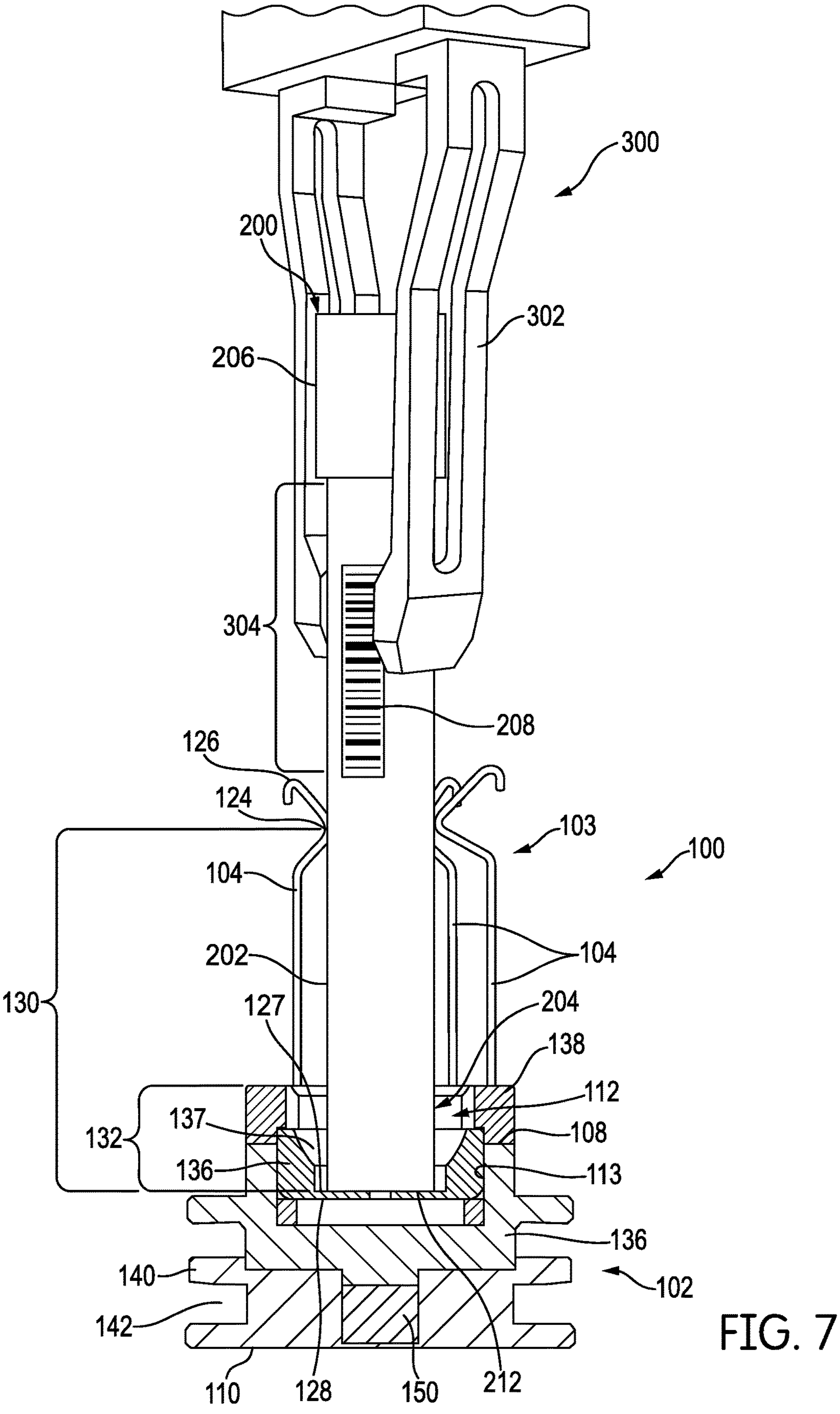
FIG. 7 is a side cross-sectional view of the carrier shown in FIG. 1 along a plane intersecting the center of the carrier while a sample receptacle is coupled to the carrier and grasped by a pick-and-place robot, according to an embodiment.

This configuration of wire fingers 104 is highly advantageous because the insertion force required to insert sample receptacle 200 into carrier 100 remains essentially constant despite positional errors with a pick-and-place robot and/or manufacturing variabilities in the shape of the sample receptacle 200. (Due to the manufacturing process, sample receptacle 200 may have a curvature, meaning that sample receptacle 200 may not have a true vertical axis, resulting in bottom end 204 of sample receptacle 200 being off-center from vertical axis VA of carrier 100 when sample receptacle 200 is grasped and inserted into carrier 100 by a pick-and-place robot 300). This is especially an issue in embodiments where sample receptacle 200 is self-standing, i.e., remains upright when placed on a horizontal surface. Self-standing receptacles have "flat" bottoms, meaning they may have a planar surface that is substantially horizontal or, alternatively, bottom surface 212 of cylindrical side wall 202 may constitute the lowest point of sample receptacle 200, as shown in FIGS. 4 and 7. Unlike round bottomed receptacles, which have an inherent self-guiding function by virtue of their shape, self-standing receptacles are not self-guiding. Thus, it is important to keep the insertion force as constant as possible, regardless of where the bottom surface 212 of sample receptacle 200 contacts fingers 104 of carrier 100.

In some embodiments, each finger 104 further includes a fourth segment 120. A third angled portion 126 joins third segment 118 and fourth segment 120. Third angled portion 126 orients fourth segment 120 such that it does not extend towards vertical axis VA of carrier 100. For example, as best seen in FIGS. 1, 3, 4 and 7, fourth segment 120 may extend downward and substantially parallel to vertical axis VA. In some embodiments, fourth segment 120 may be linear, while in other embodiments (not shown), fourth segment 120 may be non-linear.

In some embodiments, the length of fourth segment 120 is less than the length of either second segment 116 or third segment 118.

In some embodiments, the length of third segment 118 is greater than the length of second segment 116. For example, the length of third segment 118 is at least 20% greater than the length of second segment 116 in some embodiments.

Referencing FIG. 7, fingers 104 are sized and arranged such that machine-readable label 208, which is affixed to sample receptacle 200, may be read by a label reading device (not shown), such as a barcode reader. For example, the circumferential spacing of fingers 104 is such that fingers 104 do not obstruct machine-readable label 208 from the viewing path of the label reading device.

In some embodiments, a height 130 between a top surface 127 of base 128 and angled portions 124 is substantially the same for each finger 104. In some embodiments, height 130 between top surface 127 of base 128 and second angled portion 124 of each finger 104 is at least about 30 mm.

In other embodiments (not shown), height 130 varies between at least a portion of the different fingers 104.

Referencing FIG. 5, in some embodiments retention device 103 (including fingers 104) and base 102 are configured to receive a sample receptacle 200 having a height in the range of between about 75 mm and about 100 mm (without a cap). In some such embodiments, a distance 130 between bottom surface 212 of sample receptacle 200 to second angled portion 124 may be in the range of about 30 mm to about 50 mm. For example, a distance 130 may be in the range of about 35 mm to about 45 mm. And more specifically, distance 130 may be about 38 mm (i.e., about 36 mm to about 40 mm). As shown in FIG. 7, when sample receptacle 200 is fully inserted into recess 112 of carrier 100, a distance 304 above fingers 104 and below a cap 206 of sample receptacle 200 is created. Distance 304 is sufficient to allow gripper arms 302 of pick-and-place robot 300 to grasp sample receptacle 200 for insertion or removal.

A pick-and-place robot is an electromechanical device that translates a payload (e.g., an end effector such as a receptacle gripper or a pick-and-place claw) in the X, Y, and/or Z directions. In some embodiments, pick-and-place robot 300 performs all pick-and-place duties required by a sample processing instrument or assay instrument. In some embodiments, pick-and-place robot 300 is programmed, by way of a controller, to transport sample receptacles 200 and insert bottom ends 204 of sample receptacles 200 into recesses 112 of carriers 100.

Referencing FIG. 5, in some embodiments fingers 104 and base 102 are configured to receive a cylindrical sample receptacle 200 having a diameter in the range of about 12 mm to about 16 mm. In some such embodiments, a distance 146 between opposing angled portions 124 of opposed fingers 104 may be between about 11.5 mm to about 12 mm, for example, about 11.8 mm. That is, distance 146 is less than the diameter of sample receptacle 200 in some embodiments. In some embodiments, an arc length between first segments 114 may be in the range of about 7 mm to about 10 mm. For example, when the distance between opposed first segments 114 is about 18 mm, the arc length between adjacent first segments 114 may be about 7 mm. In another example, when the distance between opposed first segments 114 is about 25 mm, the arc length may be about 10 mm.

Exemplary methods of using carrier 100 to transport sample receptacles 200 will now be described. In some embodiments, a method of transporting a sample receptacle 200 includes grasping the sample receptacle 200 with a first pick-and-place robot 300. The method also uses the first pick-and-place robot 300 to insert bottom end 204 of sample receptacle 200 into recess 112 of carrier 100, thereby coupling sample receptacle 200 and carrier 100. To insert bottom end 204 of sample receptacle 200 into recess 112, the gripper arms 302 of the pick-and-place robot 300 move the receptacle 200 in a direction substantially parallel to vertical axis VA. After sample receptacle 200 is coupled with carrier 100, a conveyor assembly may transport carrier 100 with the coupled sample receptacle 200 to one or more positions within the automated laboratory system. In some embodiments, the automated laboratory system may include the various conveyor assemblies and instruments discussed in U.S. Publication No. 2017/0254827, published Sep. 7, 2017, or in U.S. Provisional Application No. 63/014,624, filed Apr. 23, 2020.

In some embodiments, the method also includes removing the sample receptacle 200 from the carrier 100 at a first location on the conveyor assembly and transporting the removed sample receptacle 200 into one of the plurality of instruments with a second pick-and-place robot.

Aspects of this disclosure are implemented via control and computing hardware components, user-created software, data input components, and data output components. Hardware components include computing and control modules (e.g., system controller(s)), such as microprocessors and computers, configured to effect computational and/or control steps by receiving one or more input values, executing one or more algorithms stored on non-transitory machine-readable media (e.g., software) that provide instruction for manipulating or otherwise acting on the input values, and output one or more output values. Such outputs may be displayed or otherwise indicated to an operator for providing information to the operator, for example information as to the status of the instrument or a process being performed thereby, or such outputs may comprise inputs to other processes and/or control algorithms. Data input components comprise elements by which data is input for use by the control and computing hardware components. Such data inputs may comprise position sensors, motor encoders, as well as manual input elements, such as graphic user interfaces, keyboards, touch screens, microphones, switches, manually operated scanners, voice-activated input, etc. Data output components may comprise hard drives or other storage media, graphic user interfaces, monitors, printers, indicator lights, or audible signal elements (e.g., buzzer, horn, bell, etc.).

Software comprises instructions stored on non-transitory computer-readable media which, when executed by the control and computing hardware, cause the control and computing hardware to perform one or more automated or semi-automated processes.

While the present disclosure has been described and shown in considerable detail with reference to certain illustrative embodiments, including various combinations and sub-combinations of features, those skilled in the art will readily appreciate other embodiments and variations and modifications thereof as encompassed within the scope of the present disclosure. Moreover, the descriptions of such embodiments, combinations, and sub-combinations is not intended to convey that the disclosure requires features or combinations of features other than those expressly recited in the claims. Accordingly, the present disclosure is deemed to include all modifications and variations encompassed within the spirit and scope of the following appended claims.

All documents referred to herein are hereby incorporated by reference herein. No document, however, is admitted to be prior art to the claimed subject matter.

Furthermore, those of the appended claims which do not include language in the "means for performing a specified function" format permitted under 35 U.S.C. § 112(f) are not intended to be interpreted under 35 U.S.C. § 112(f), as being limited to the structure, material, or acts described in the present specification and their equivalents.

What is claimed is:

1. A carrier for transporting a sample receptacle, the carrier comprising:

a base having a top end defining a recess for receiving a bottom end of the sample receptacle;

an annular support coupled to the top end of the base and circumscribing the recess; and a plurality of resilient wire fingers affixed to and extending upward from a top surface of the annular support, the plurality of resilient wire fingers being configured to (i) retain the bottom end of the sample receptacle within the recess of the base and (ii) maintain the sample receptacle in a substantially upright orientation, each resilient wire finger comprising a first segment adjacent to the base, a linear second segment joined to the first segment, and a linear third segment joined to the second segment, wherein the first and second segments of each resilient wire finger are joined by a first angled portion of the resilient wire finger, the first angled portion orienting the second segment toward a vertical axis VA of the carrier, wherein the second and third segments of each resilient wire finger are joined by a second angled portion of the resilient wire finger, the second angled portion orienting the third segment away from the vertical axis VA of the carrier, wherein the second segment has a second segment length, and the thiord segment has a third segment length that is greater than the second segment length, wherein the third segment of each resilient wire finger is configured to contact the bottom end of the sample receptacle as the receptacle is inserted into the carrier, and wherein the third segment and the vertical axis VA of the carrier form an angle a between 40° and 50°.

2. The carrier of claim 1, wherein each resilient wire finger further comprises a fourth segment, wherein the third and fourth segments of each resilient wire finger are joined by a third angled portion of the resilient wire finger, and wherein the third angled portion does not orient the fourth segment toward the vertical axis VA of the carrier.

3. The carrier of claim 2, wherein the fourth segment is a linear segment.

4. The carrier of claim 3, wherein the fourth segment extends downward from the third angled portion of the resilient wire finger.

5. The carrier of claim 4, wherein the fourth segment is generally parallel to the vertical axis VA of the carrier.

6. The carrier of claim 2, wherein the fourth segment has a fourth segment length, and wherein the third segment length is greater than the fourth segment length.

7. The carrier of claim 6, wherein the second segment has a second segment length that is greater than the fourth segment length.

8. The carrier of claim 1, wherein the third segment length is at least 20% greater than the second segment length.

9. The carrier of claim 1, wherein the first segment is a linear segment.

10. The carrier of claim 1, wherein the angle a is between 42.5° and 47.5°.

11. The carrier of claim 1, wherein the angle a is 45°.

12. The carrier of claim 1, wherein the plurality of resilient wire fingers comprises at least five equally spaced apart resilient wire fingers.

13. The carrier of claim 1, wherein the plurality of resilient wire fingers consists of eight equally spaced apart resilient wire fingers.

14. The carrier of claim 1, wherein the plurality of resilient wire fingers are sized and arranged such that a machine-readable label affixed to the sample receptacle can be read by a label reading device.

15. The carrier of claim 1, wherein the second angled portions of the plurality of resilient wire fingers are configured to be the only points of contact between the plurality of resilient wire fingers and a cylindrical side wall of the sample receptacle when the bottom end of the sample receptacle contacts a bottom of the recess.

16. The carrier of claim 15, wherein the second angled portion of each of the plurality of resilient wire fingers is situated at least 30 mm from the bottom of the recess.

17. The carrier of claim 1, wherein the second angled portions of the plurality of resilient wire fingers have a common height.

18. The carrier of claim 1, wherein the base comprises a plastic cylinder, and wherein the annular support comprises a metal.

19. The carrier of claim 18, wherein the base contains a magnet.

20. The carrier of claim 18, wherein the base comprises a plurality of spaced apart, radially extending annular flanges.

21. The carrier of claim 20, wherein the base comprises three of the radially extending annular flanges, one of the radially extending flanges forming a bottom of the base.

22. The carrier of claim 1, wherein each of the plurality of resilient wire fingers is formed from stainless steel having a gauge in a range of about 0.6 mm to about 1.0 mm.

23. The carrier of claim 1, wherein the third segment of each resilient wire finger projects horizontally away from the vertical axis VA of the carrier such that a center of the bottom end of the sample receptacle may deviate from the vertical axis VA of the carrier by up to 6 mm without substantially affecting the force required to insert the sample receptacle into the carrier.

24. A carrier for transporting a sample receptacle, the carrier comprising:

a base having a top end defining a recess for receiving a bottom end of the sample receptacle;

an annular support coupled to the top end of the base and circumscribing the recess; and a plurality of resilient wire fingers affixed to and extending upward from the annular support, the plurality of resilient wire fingers being configured to (i) retain the bottom end of the sample receptacle within the recess of the base and (ii) maintain the sample receptacle in a substantially upright orientation, each resilient wire finger comprising a first segment adjacent to the base, a linear second segment joined to the first segment, and a linear third segment joined to the second segment, wherein each of the plurality of resilient wire fingers is formed from stainless steel having a gauge in a range of about 0.6 mm to about 1.0 mm, wherein the first and second segments of each resilient wire finger are joined by a first angled portion of the resilient wire finger, the first angled portion orienting the second segment toward a vertical axis VA of the carrier, wherein the second and third segments of each resilient wire finger are joined by a second angled portion of the resilient wire finger, the second angled portion orienting the third segment away from the vertical axis VA of the carrier, wherein the second segment has a second segment length, and the third segment has a third segment length that is greater than the second segment length, wherein the third segment of each resilient wire finger is configured to contact the bottom end of the sample receptacle as the receptacle is inserted into the carrier, and wherein the third segment and the vertical axis VA of the carrier form an angle a between 40° and 50°.

25. The carrier of claim 24, wherein each resilient wire finger further comprises a fourth segment, the third and fourth segments of each resilient wire finger are joined by a third angled portion of the resilient wire finger, and wherein the third angled portion does not orient the fourth segment toward the vertical axis VA of the carrier.

26. The carrier of claim 25, wherein the fourth segment is a linear segment extending downward from the third angled portion of the resilient wire finger and generally parallel to the vertical axis VA of the carrier.

27. The carrier of claim 25, wherein the fourth segment has a fourth segment length, the third segment length that is greater than the fourth segment length, and the second segment length is greater than the fourth segment length.

28. The carrier of claim 27, wherein the third segment length is at least 20% greater than the second segment length.

29. The carrier of claim 24, wherein the base comprises a plastic cylinder and contains a magnet, and wherein the annular support comprises a metal.

30. The carrier of claim 24, wherein the third segment of each resilient wire finger projects horizontally away from the vertical axis VA of the carrier such that a center of the bottom end of the sample receptacle may deviate from the vertical axis VA of the carrier by up to 6 mm without substantially affecting the force required to insert the sample receptacle into the carrier.

* * * * *